(12) United States Patent
Walker et al.

(10) Patent No.: US 11,527,114 B2
(45) Date of Patent: Dec. 13, 2022

(54) TRANSCEIVER FOR A CAN BUS SYSTEM AND METHOD FOR DETECTING A SHORT CIRCUIT USING A CAN TRANSCEIVER

(71) Applicant: Robert Bosch GmbH, Stuttgart (DE)

(72) Inventors: Steffen Walker, Reutlingen (DE); Arthur Mutter, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 16/631,906

(22) PCT Filed: Jul. 18, 2018

(86) PCT No.: PCT/EP2018/069505
§ 371 (c)(1),
(2) Date: Jan. 17, 2020

(87) PCT Pub. No.: WO2019/016265
PCT Pub. Date: Jan. 24, 2019

(65) Prior Publication Data
US 2020/0160629 A1 May 21, 2020

(30) Foreign Application Priority Data
Jul. 21, 2017 (DE) .............................. 102017212544

(51) Int. Cl.
*H04L 12/417* (2006.01)
*G07C 5/08* (2006.01)
(Continued)

(52) U.S. Cl.
CPC ........... *G07C 5/0808* (2013.01); *G07C 5/008* (2013.01); *H04L 12/40013* (2013.01);
(Continued)

(58) Field of Classification Search
CPC ......... H04L 12/40013; H04L 12/10182; H04L 12/412
See application file for complete search history.

(56) References Cited

U.S. PATENT DOCUMENTS 5,267,251 A * 11/1993 Lenoir ................ H04L 25/0292
714/E11.004
10,334,089 B2 * 6/2019 Hartwich ............ H04L 12/4135
(Continued)

FOREIGN PATENT DOCUMENTS

CN 103946829 A 7/2014
CN 105409175 A 3/2016
(Continued)

OTHER PUBLICATIONS

International Search Report for PCT/EP2018/069505, dated Sep. 27, 2018.

*Primary Examiner* — Abdelnabi O Musa
(74) *Attorney, Agent, or Firm* — Norton Rose Fulbright US LLP; Gerard Messina (57) ABSTRACT

A transceiver for a CAN bus system and a method for detecting a short circuit using a CAN transceiver. The transceiver includes a transmitter for transmitting a transmission signal to a first bus wire of a bus of the bus system, exclusive, collision-free access to the bus of the bus system of a user station being at least temporarily ensured in the bus system, and for transmitting the transmission signal to a second bus wire of the bus, a receiver for receiving the bus signal transmitted on the bus wires, and a diagnostic unit for detecting a short circuit in the bus system, the diagnostic unit being designed to carry out a diagnosis only in a predetermined communication phase of the bus signal.

10 Claims, 4 Drawing Sheets

(51) Int. Cl.
   *G07C 5/00*   (2006.01)
   *H04L 12/40*  (2006.01)
(52) U.S. Cl.
   CPC ...... *H04L 12/40182* (2013.01); *H04L 12/417* (2013.01); *H04L 2012/40215* (2013.01); *H04L 2012/40273* (2013.01)

(56) References Cited

U.S. PATENT DOCUMENTS

| | | | | |
|---|---|---|---|---|
| 2002/0097789 | A1* | 7/2002 | Muth | G06F 13/385 |
| | | | | 375/219 |
| 2002/0157062 | A1* | 10/2002 | Greiner | H03M 13/17 |
| | | | | 714/801 |
| 2004/0056765 | A1* | 3/2004 | Anderson | G08B 17/10 |
| | | | | 340/584 |
| 2005/0273210 | A1* | 12/2005 | Pfaffeneder | B60R 16/0315 |
| | | | | 701/1 |
| 2006/0109601 | A1* | 5/2006 | Bolz | H04L 25/08 |
| | | | | 361/119 |
| 2010/0033163 | A1* | 2/2010 | Ahrens | H04L 25/08 |
| | | | | 324/76.11 |
| 2015/0009598 | A1* | 1/2015 | Trombetti | G06F 11/221 |
| | | | | 361/86 |
| 2017/0262394 | A1* | 9/2017 | De Haas | H04L 12/40032 |
| 2017/0262400 | A1* | 9/2017 | Hartwich | H04L 1/0041 |
| 2019/0018817 | A1* | 1/2019 | Williams | G06F 13/4265 |
| 2021/0377070 | A1* | 12/2021 | Mutter | H04L 12/407 |
| 2021/0406213 | A1* | 12/2021 | Mutter | H04L 12/407 |
| 2022/0070020 | A1* | 3/2022 | Mutter | H04L 12/4013 |

FOREIGN PATENT DOCUMENTS

| | | |
|---|---|---|
| DE | 102008002946 A1 | 1/2010 |
| DE | 102008052781 A1 | 4/2010 |
| JP | 2002232492 A | 8/2002 |
| JP | 2006191404 A | 7/2006 |
| JP | 2010081420 A | 4/2010 |
| JP | 2010111295 A | 5/2010 |

* cited by examiner

TRANSCEIVER FOR A CAN BUS SYSTEM AND METHOD FOR DETECTING A SHORT CIRCUIT USING A CAN TRANSCEIVER

FIELD

The present invention relates to a transceiver for a Controller Area Network (CAN) bus system and a method for detecting a short circuit using a CAN transceiver. The transceiver is usable in particular in a CAN FD bus system for detecting short circuits of individual bus lines or bus wires of a bus of the bus system.

BACKGROUND INFORMATION

The CAN bus system is used for message or data transmission in some technical applications. Examples include communication between sensors and control units in a vehicle, or a technical production facility, etc. In such a bus system, messages are transmitted via the CAN protocol and/or CAN FD protocol, as described in the ISO-11898-1:2015 standard as a CAN protocol specification with CAN FD. In a CAN FD bus system, a data transmission rate of greater than 1 Mbit per second (1 Mbps) is possible, for example 2 Mbit/s, 5 Mbit/s, or some other data transmission rate greater than 1 Mbit/s, etc. In addition, a CAN high-speed (HS) bus system is known for which a data transmission rate of up to 500 Kilobit per second (500 kbit/s) is possible.

The CAN bus system is a communication system in which a bus state is actively driven. In the process, a signal for a bus signal CAN_H and a signal for a bus signal CAN_L are separately driven. Transceivers, also referred to as CAN transceivers, CAN FD transceivers, etc., are generally used for transmitting and receiving in a CAN bus system for the individual communication users.

The transceiver is supplied with voltage via a voltage VCC of 5 V that is applied against ground GND. In a vehicle, for example, voltage VCC is delivered by a battery with a voltage Ubat having a value in particular of 12 V or 14 V.

In a CAN bus system, a transceiver for gateway control units requires a so-called diagnostic capability. Accordingly, the transceiver must detect the following errors for CAN as well as for CAN FD:
short circuit of the bus wire for CAN_H to Ubat
short circuit of the bus wire for CAN_H to VCC5V
short circuit of the bus wire for CAN_H to GND
short circuit of the bus wire for CAN_L to Ubat
short circuit of the bus wire for CAN_L to VCC5V
short circuit of the bus wire for CAN_L to GND.

SUMMARY

An object of the present invention is to provide an example transceiver for a CAN bus system and an example method for detecting a short circuit using a CAN transceiver which address the problems mentioned above.

The object may be achieved by providing an example transceiver for a bus system in accordance with the present invention. The example transceiver includes a transmitter for transmitting a transmission signal to a first bus wire of a bus of the bus system, exclusive, collision-free access to the bus of the bus system by a user station being at least temporarily ensured in the bus system, and for transmitting the transmission signal to a second bus wire of the bus, a receiver for receiving the bus signal transmitted on the bus wires, and a diagnostic unit for detecting a short circuit in the bus system, the diagnostic unit being designed to carry out a diagnosis only in a predetermined communication phase of the bus signal.

The described transceiver may be used to achieve the desired diagnostic capability with regard to short circuits. Accordingly, in particular a short circuit of the bus wires may be reliably detected, for example of CAN_H to Ubat and/or of CAN_H to VCC5V and/or of CAN_H to GND and/or of CAN_L to Ubat and/or of CAN_L to VCC5V and/or of CAN_L to GND.

Another advantage of the transceiver is that a possible short circuit may be detected during operation of the transceiver. The operation of the transceiver is not disturbed by the diagnosis that is carried out.

Further advantageous embodiments of the transceiver are described herein.

The diagnostic unit may possibly be designed to carry out a diagnosis in a communication phase of the bus signal in which the transmission rate of the bus signal is equal to or less than 500 Kilobit per second (kbit/s) when a common mode choke having an inductance of 100 micro-Henries (µH) is connected upstream from the transceiver, and/or in which the transmission rate of the bus signal is lower than in another communication phase of the bus signal.

According to one exemplary embodiment, the diagnostic unit is designed to carry out a diagnosis in an arbitration phase in which a determination is made as to which of the user stations is the next to temporarily obtain the exclusive, collision-free access to the bus of the bus system.

According to another variant, the diagnostic unit may be designed to carry out a diagnosis with regard to a predetermined bit sequence. The predetermined bit sequence determines, for example, the end of a message that is to be transmitted via the bus. In addition, the diagnostic unit may be designed to carry out a diagnosis only with regard to a portion of the predetermined bit sequence. It is also possible to transmit the predetermined bit sequence in a communication phase in which multiple user stations transmit at the same time.

In one particular embodiment, the receiver may include a reception comparator for receiving the bus signals, a communication phase detection block being connected in parallel to the inputs of the reception comparator, and the communication phase detection block being designed for detecting the present communication phase of the bus signal, and the diagnostic unit being designed to activate or deactivate its diagnosis based on the detection result of the communication phase detection block.

The above-described transceiver may be part of a bus system that includes a bus, and at least two user stations that are connected to one another via the bus in such a way that they are able to communicate with one another. At least one of the at least two user stations includes an above-described transceiver.

Moreover, the above-mentioned object may be achieved by an example method for detecting a short circuit using a CAN transceiver in accordance with the present invention. The example method is carried out with a transceiver for a bus system in which exclusive, collision-free access to a bus of the bus system by a user station is at least temporarily ensured. The transceiver includes a transmitter, a receiver, and a diagnostic unit, the method including the steps: transmitting, via the transmitter, a transmission signal to a first bus wire of the bus, transmitting the transmission signal to a second bus wire of the bus, receiving, via the receiver, the bus signal that is transmitted on the bus wires, and carrying out a diagnosis, using the diagnostic unit, only in a predetermined communication phase of the bus signal in order to detect a short circuit in the bus system.

The method provides the same advantages as mentioned above with regard to the transceiver.

Further possible implementations of the present invention also include combinations, not explicitly mentioned, of features or specific embodiments described above or below with regard to the exemplary embodiments. Those skilled in the art will also add individual aspects as enhancements or additions to the particular basic form of the present invention.

BRIEF DESCRIPTION OF THE DRAWINGS

The present invention is described in greater detail below with reference to the figures, and based on exemplary embodiments.

Unless stated otherwise, similar or functionally equivalent elements are provided with the same reference numerals in the figures.

DETAILED DESCRIPTION OF EXAMPLE EMBODIMENTS

Figure 1:
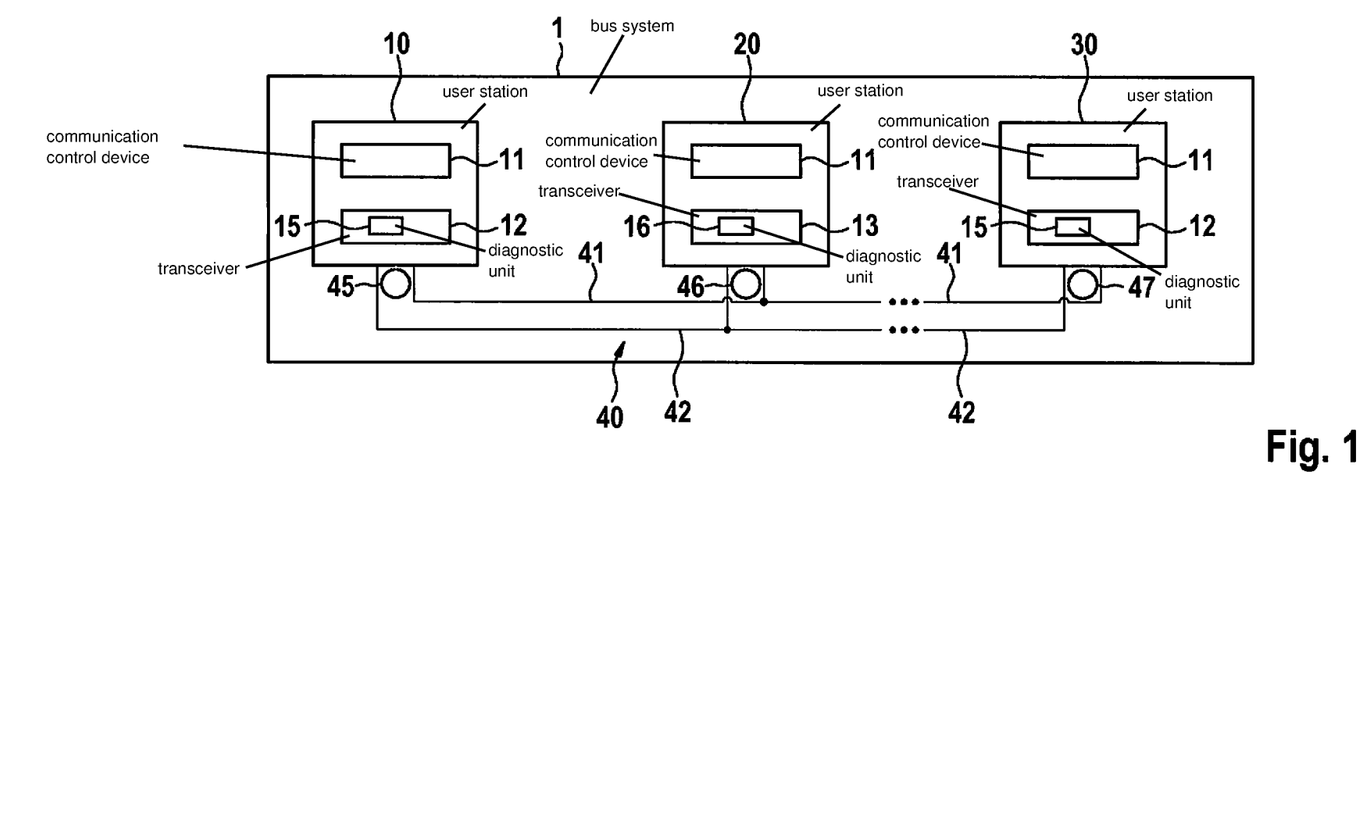
FIG. 1 shows a simplified block diagram of a bus system according to a first exemplary embodiment.

FIG. 1 shows a bus system 1 which at least in part may be, for example, a CAN bus system, a CAN FD bus system, etc. Bus system 1 may be used in a vehicle, in particular a motor vehicle, an aircraft, etc., or in a hospital, etc.

In FIG. 1, bus system 1 includes a plurality of user stations 10, 20, 30, each connected to a bus 40 including a first bus wire 41 and a second bus wire 42. Bus wires 41, 42 may also be referred to as CAN_H and CAN_L, and are used for coupling the dominant levels in the transmission state. Messages 45, 46, 47 in the form of signals may be transmitted between individual user stations 10, 20, 30 via bus 40. User stations 10, 20, 30 may be, for example, control units or display devices of a motor vehicle.

As shown in FIG. 1, user stations 10, 30 each include a communication control device 11 and a transceiver 12. Transceivers 12 each include a diagnostic unit 15. In contrast, user station 20 includes a communication control device 11 and a transceiver 13. Transceiver 13 includes a diagnostic unit 16. Transceivers 12 of user stations 10, 30 and transceiver 13 of user station 20 are each directly connected to bus 40, even though this is not illustrated in FIG. 1.

Communication control device 11 is used for controlling a communication of the particular user station 10, 20, 30 via bus 40 with another user station of user stations 10, 20, 30 connected to bus 40. Transceiver 12 is used for transmitting and receiving messages 45, 47 in the form of signals, and uses diagnostic unit 15, as described below in greater detail. Communication control device 11 may in particular be designed as a conventional CAN controller and/or a CAN controller. Transceiver 12 may, in particular, be a conventional CAN transceiver and/or CAN FD transceiver. Transceiver 13 is used for transmitting and receiving messages 46 in the form of signals, and uses diagnostic unit 16, as described below in greater detail. Otherwise, transceiver 13 may be designed as a conventional CAN transceiver.

Figure 2:
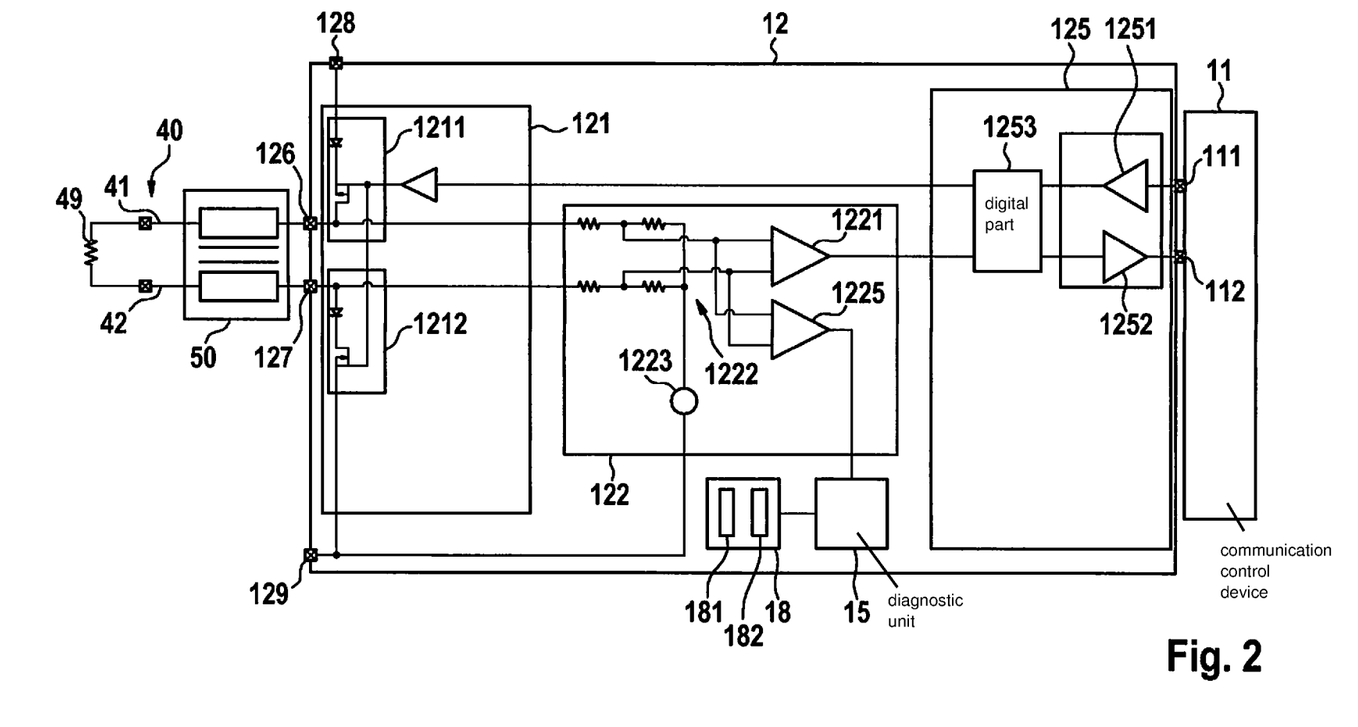
FIG. 2 shows a circuit diagram of a first transceiver in the bus system according to the first exemplary embodiment.

FIG. 2 shows the basic design of transceiver 12 together with diagnostic unit 15 and a memory unit 18. Transceiver 12 is connected at terminals 126, 127 to bus 40, more precisely, first bus wire 41 of the bus for CAN_H and second bus wire 42 of the bus for CAN_L, via a common mode choke 50. Common mode choke 50 has an inductance of 100 µH, for example. At transceiver 12, the voltage supply, in particular the CAN supply, for first and second bus wires 41, 42 is provided via a terminal 128. The connection of transceiver 12 to ground, i.e., CAN_GND, is established via a terminal 129. In the example shown, a terminating resistor 49 is provided for terminating first and second bus wires 41, 42.

In transceiver 12, first and second bus wires 41, 42 are connected to a transmitter 121 and to a receiver 122. A connector unit 125 for driving signals via terminals 111, 112 to communication control device 11 is connected to transmitter 121 and to receiver 122.

For driving the signals of terminals 111, 112, connector unit 125 includes a transmission signal driver 1251 for a transmission signal TxD, also referred to as a TxD signal, that is received at terminal 111 by communication control device 11. In addition, connector unit 125 includes a reception signal driver 1252 for a reception signal RxD, also referred to as an RxD signal. Reception signal RxD has been received by bus wires 41, 42 with the aid of receiver 122, and is relayed to communication control device 11 via terminal 112. Drivers 1251, 1252 are connected to transmitter 121 and receiver 122 via a digital part 1253. Digital part 1253 may carry out monitoring of signals TxD, RxD.

According to FIG. 2, transmitter 121 includes a conventional driver 1211 for signal CAN_H for first bus wire 41, and a conventional driver 1212 for the signal for CAN_L for second bus wire 42.

Receiver 122 includes a reception comparator 1221 whose inputs are connected in a resistive, in particular symmetrical, voltage divider 1222, more precisely, the center tap thereof, a bus bias voltage unit 1223, and a communication phase detection block 1225. Bus bias voltage unit 1223 feeds resistive voltage divider 1222 at its one end with a predetermined bus bias voltage or a predetermined bus bias voltage potential. At its other end, resistive voltage divider 1222 is connected to first and second bus wires 41, 42. The inputs of reception comparator 1221 are connected in parallel to the inputs of communication phase detection block 1225. As shown in the example in FIG. 2, communication phase detection block 1225 may include a differential amplifier whose inputs are connected in parallel to the inputs of reception comparator 1221.

Communication phase detection block 153 may detect and recognize or differentiate the different phases of a communication on bus 40, explained below with reference to FIG. 3.

Diagnostic unit 15 diagnoses or checks, based on the detection result of communication phase detection block 1225, whether or not a short circuit is present on bus wires 41, 42. Diagnostic unit 15 carries out its diagnosis only when a predetermined phase of the communication is present. In other words, diagnostic unit 15 is designed to activate or deactivate its diagnosis based on the detection result of communication phase detection block 1225.

The result of the detection via diagnostic unit 15 is written into memory unit 18 in registers 181, 182. Registers 181, 182 may be read out as needed, so that, for example, a warning message may be output when a short circuit is detected.

Figure 3:
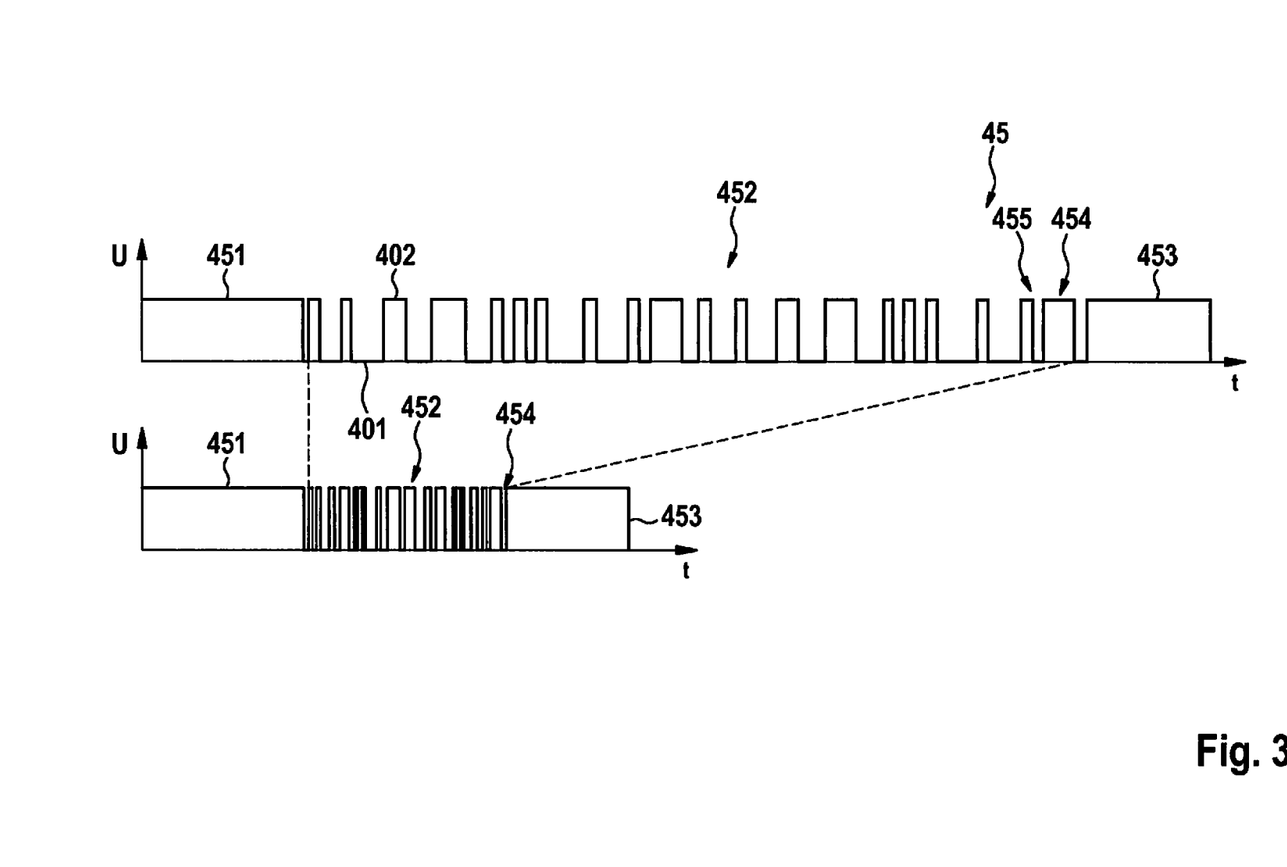
FIG. 3 shows a diagram for illustrating the structure of a message that is transmitted from a user station of the bus system according to the first exemplary embodiment.

According to FIG. 3, the information and data to be transmitted in a message 45, as well as messages 46, 47, are stored in bytes or bits, which may assume two different bit states or voltage states. The different bit states of a transmission signal TxD thus have different bus states 401, 402 during transmission of message 45, 46, 47 via bus 40. In the example shown, first bus state 401 corresponds to a dominant bus state. Second bus state 402 corresponds to a recessive bus state.

The upper part of FIG. 3 shows, with reference to message 45, a CAN frame that is transmitted by transceiver 12 or transceiver 13. The lower part of FIG. 3 shows a CAN FD frame, which may alternatively be transmitted by transceiver 12.

For the CAN communication on bus 40, the CAN frame and the CAN FD frame are basically divided into two different communication phases, namely, arbitration phases 451, 453, and a data area 452, which for the CAN HS is also referred to as a data field, and which for the CAN FD is also referred to as a data phase. Data area 452 on its end is terminated with at least one end bit 454, also referred to as end-of-frame (EOF) or end-of-message. For CAN or CAN FD, the EOF is a bit sequence made up of 11 recessive bits, i.e., bits having second bus state 402. The at least one end bit 454 is preceded by an acknowledgement phase 455.

For CAN FD, in comparison to the conventional CAN, the bit rate for the subsequent data phase increases to 2, 4, 8 Mbps, for example, at the end of arbitration phase 451. As a result, for CAN FD the bit rate in arbitration phases 451, 453 is lower than the bit rate in data area 452. For CAN FD, data area 452 is greatly shortened compared to data area 452 of the CAN frame.

In a CAN frame and a CAN FD frame, arbitration phases 451, 453 are used to decide which node or which user station 10, 20, 30 of bus system 1 is carrying most important message 45, 46, 47. User station 10, 20, 30 with most important message 45, 46, 47 wins the arbitration and therefore is permitted to transmit the message after conclusion of the arbitration phase. All other user stations are then "listeners" during transmission of this most important message. Transceivers 12, 13 drive bus 40 with low impedance to establish a dominant bus state 402 or bit state as one of the two different bus states 401, 402 or bit states. In contrast, in the recessive state, as the other of the two different bus states 401, 402, transceivers 12, 13 have relatively high impedance.

Communication phase detection block 1225 in FIG. 2 may in particular recognize arbitration phases 451, 453, data area 452, and the end of data area 453, i.e., the least one end bit (EOF) 454.

Thus, the functionality of diagnostic unit 15 may be utilized, as desired, only for communication phases in which the data transmission rate in a CAN frame or CAN FD frame is lower than in other communication phases. As a result, the diagnosis by diagnostic unit 15 is carried out in the slower phases of the communication in bus system 1. For a common mode choke 50 having an inductance of 100 pH, such communication phases having a lower transmission rate are less than or equal to in particular 500 kbit/s. At 500 kbit/s, a bit lasts 2 μs. In particular, such a communication phase in a CAN frame or CAN FD frame is arbitration phase 451, 453.

If common mode choke 50 has an inductance of less than 100 pH, it would be possible to carry out the diagnosis by diagnostic unit 15 at a transmission rate of greater than or equal to 500 kbit/s. Conversely, for inductance values of common mode choke 50 greater than 100 pH, the diagnosis by diagnostic unit 15 is to be carried out at a transmission rate lower than 500 kbit/s.

In the present exemplary embodiment, diagnostic unit 15 carries out a diagnosis only in arbitration phases 451, 453.

This ensures that transceiver 12 is able to reliably detect short circuits. This also applies when, after a transition from recessive to dominant, i.e., from second bus state 402 to first bus state 401, transceiver 12, decoupled by choke 50, is to create a dominant state for a time of approximately 1 μs. In the stated case, a short circuit on the bus side cannot be detected during such a time window. Diagnostic unit 15 is therefore designed in such a way that a time period much greater than 1 μs is awaited after a transition from recessive to dominant, before bus voltages CAN_H, CAN_L and/or their differential voltage VDIFF are/is detected for a diagnosis. The stated time period ensures that waiting is carried out for a waiting period until the oscillations, which arise after a transition from recessive to dominant, i.e., from second bus state 402 to first bus state 401, in bus voltages CAN_H, CAN_L die down. The oscillations result from common mode choke 50 and parasitic capacitances. The stated waiting period results in a time window for the diagnosis by diagnostic unit 15 which is independent of the bit rate in the CAN frame or the CAN FD frame. However, the time window is determined by the transmission levels of transceiver 12 and the time constant of common mode choke 50.

In one modification of transceiver 12, the assessment of whether or not a short circuit is present is carried out is based only on dominant states, i.e., first bus states 401. The dominant states may be detected in arbitration phases 451, 453 in comparison to short circuits.

Figure 4:
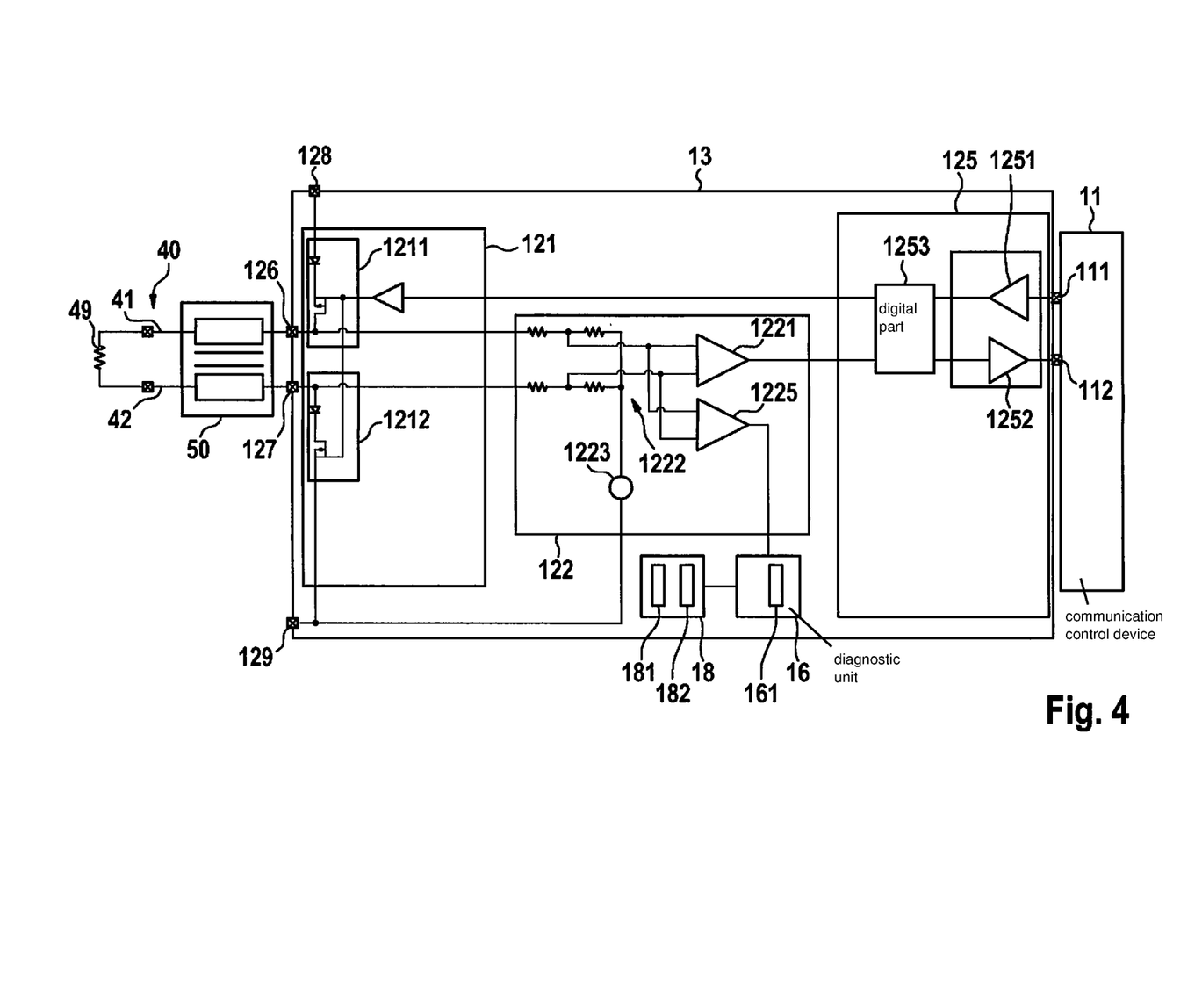
FIG. 4 shows a circuit diagram of a second transceiver in the bus system according to the first exemplary embodiment.

According to FIG. 4, transceiver 13 has essentially the same design as transceiver 12. However, transceiver 13 includes diagnostic unit 16 instead of diagnostic unit 15.

Diagnostic unit 16 is designed, for example, to carry out the diagnosis with regard to a possibly present short circuit based only on recessive states of a CAN frame or a message 46, or based on bits having second bus state 402. Diagnostic unit 16 may in particular test the at least one end bit (EOF) 454 to decide whether or not a short circuit is present.

For the at least one end bit (EOF) 454, in particular in diagnostic unit 16, a filter element 161 may be provided that recognizes 6 to 11 successive recessive bits, i.e., bits having second bus state 402. In this regard, the at least one end bit (EOF) 454 provides a comparatively long time window to carry out the diagnosis in the recessive state. Diagnostic unit 16 is thus designed to carry out a diagnosis only with regard to a portion of the predetermined bit sequence of the at least one end bit (EOF) 454.

Diagnostic unit 16 also provides reliable detection of short circuits of bus wires 41, 42.

In one modification of transceiver 12 or transceiver 13, the assessment of whether or not a short circuit is present is carried out based on dominant and recessive states. The dominant states are assessed in particular in arbitration phase 451, 453.

According to another modification, transceiver 12 may also include a filter element 161 for carrying out a diagnosis only with regard to a portion of a predetermined bit sequence.

Thus, diagnostic units 15, 16 are used in each case to carry out a method for detecting a short circuit using the particular transceiver 12, 13.

According to a second exemplary embodiment, transceiver 13, more precisely its diagnostic unit 16, is used to carry out the assessment of whether or not a short circuit is present, based on the at least one end bit (EOF) 454 and based on acknowledgement phase 455 of the CAN frame according to FIG. 3, i.e., a message 46. In acknowledgement phase 455, which in the CAN frame includes the two bits prior to the at least one end bit (EOF) 454, multiple transceivers 12, 13 transmit at the same time. In the case of low-impedance short circuits, the diagnostic results based on acknowledgement phase 455 would be the same as the diagnostic result during a dominant bit without acknowledgement. Otherwise, in principle other voltage levels or bus states must occur here.

Diagnostic unit 16 according to the second exemplary embodiment achieves the same advantages as those mentioned with regard to diagnostic units 15, 16 according to the first exemplary embodiment.

All the above-described embodiments of diagnostic units 15, 16, of transceivers 12, 13, of user stations 10, 20, 30, of bus system 1, and of the method according to the first and second exemplary embodiments carried out therein and modifications thereof may be used individually or in any possible combination. In addition, the following modifications in particular are possible.

Above-described bus system 1 according to the first and second exemplary embodiments is described with reference to a bus system based on the CAN protocol. However, bus system 1 according to the first and/or second exemplary embodiment may also be some other type of communications network. It is advantageous, but not necessarily a requirement, that for bus system 1, exclusive, collision-free access to bus line 40 or a shared channel of bus line 40 by a user station 10, 20, 30 is ensured, at least for certain time periods.

Bus system 1 according to the first and/or second exemplary embodiment and its modifications is in particular a CAN network or a CAN HS network or a CAN FD network or a FlexRay network. However, bus system 1 may also be some other serial communications network.

The number and configuration of user stations 10, 20, 30 in bus system 1 according to the first and second exemplary embodiments and their modifications is arbitrary. In particular, it is possible for only user stations 10 or user stations 20 or user stations 30 to be present in bus systems 1 in the first or second exemplary embodiment. Notwithstanding, it is also possible for only diagnostic units 15 or only diagnostic units 16 according to the various embodiment variants described above to be present.

The functionality of the exemplary embodiments described above may be implemented in a transceiver 12, 13 or a CAN transceiver, a transceiver chipset, a CAN transceiver chipset, etc. Additionally or alternatively, they may be integrated into existing products. In particular, it is possible to implement the functionality in question either in the transceiver as a separate electronic module (chip), or embedded in an integrated overall approach in which only one electronic module (chip) is present.

What is claimed is:

1. A transceiver for a user station of a plurality of user stations of a Controller Area Network (CAN) bus system, comprising:
a transmitter to transmit a transmission signal to a first bus wire of a bus of the CAN bus system, collision-free access to the bus of the bus system by the user station being ensured in the bus system, and configured to transmit the transmission signal to a second bus wire of the bus;
a receiver to receive the bus signal transmitted on the first and second bus wires; and
a diagnostic unit to detect a short circuit in the bus system, and to carry out a diagnosis only in a predetermined communication phase of the bus signal;
wherein each of the user stations includes a communication control device for controlling a communication of the user station with another one of the user stations connected to bus,
wherein the transceiver is connected via first and second bus wires at first and second terminals to the bus via a common mode choke having an inductance, wherein at a transceiver, a voltage supply is provided via a third terminal, wherein a connection of the transceiver to a ground is established via a fourth terminal, and wherein a terminating device is provided for terminating the first and second bus wires, and
wherein in the transceiver, the first and second bus wires are connected to the transmitter and the receiver, wherein a connector unit, which is for driving the signals via terminals to the communication control device, is connected to the transmitter and to the receiver.

2. The transceiver as recited in claim 1, wherein the diagnostic unit is configured to carry out the diagnosis in the communication phase of the bus signal: (i) in which a transmission rate of the bus signal is equal to or less than 500 Kilobit per second (kbit/s) when a common mode choke having an inductance of 100 micro-Henries (µH) is connected upstream from the transceiver, and/or (ii) in which the transmission rate of the bus signal is lower than in another communication phase of the bus signal.

3. The transceiver as recited in claim 1, wherein the diagnostic unit is designed to carry out the diagnosis in an arbitration phase in which a determination is made as to which of a plurality of user stations is next to temporarily obtain the, collision-free access to the bus of the bus system.

4. The transceiver as recited in claim 1, wherein the diagnostic unit is configured to carry out the diagnosis with regard to a predetermined bit sequence.

5. The transceiver as recited in claim 4, wherein the predetermined bit sequence determines an end of a message that is to be transmitted via the bus.

6. The transceiver as recited in claim 4, wherein the diagnostic unit is configured to carry out the diagnosis only with regard to a portion of the predetermined bit sequence.

7. The transceiver as recited in claim 4, wherein the predetermined bit sequence is transmitted in a communication phase in which multiple user stations transmit at the same time.

8. The transceiver as recited in claim 1, further comprising:
a reception comparator to receive the bus signals;
a communication phase detection block connected in parallel to inputs of the reception comparator, the communication phase detection block configured to detect a present communication phase of the bus signal;
wherein the diagnostic unit is configured to activate or deactivate its diagnosis based on a detection result of the communication phase detection block.

9. A bus system, comprising:
a bus; and
at least two user stations that are connected to one another via the bus so that they are able to communicate with one another, at least one of the at least two user stations including a transceiver for a Controller Area Network (CAN) bus system, the transceiver including a transmitter to transmit a transmission signal to a first bus wire of a bus of the CAN bus system, collision-free access to the bus of the bus system by a user station being ensured in the bus system, and to transmit the transmission signal to a second bus wire of the bus, a receiver to receive the bus signal transmitted on the first and second bus wires, and a diagnostic unit to detect a short circuit in the bus system, the diagnostic unit being configured to carry out a diagnosis only in a predetermined communication phase of the bus signal;

wherein each of the user stations includes a communication control device for controlling a communication of the user station with another one of the user stations connected to bus, and wherein the transceiver is connected via first and second bus wires at first and second terminals to the bus via a common mode choke having an inductance, wherein at a transceiver, a voltage supply is provided via a third terminal, wherein a connection of the transceiver to a ground is established via a fourth terminal, and wherein a terminating device is provided for terminating the first and second bus wires, and wherein in the transceiver, the first and second bus wires are connected to the transmitter and the receiver, wherein a connector unit, which is for driving the signals via terminals to the communication control device, is connected to the transmitter and to the receiver.

10. A method for detecting a short circuit using a transceiver of a user station of a plurality of user stations of a Controller Area Network (CAN) transceiver, the method comprising:

transmitting, via a transmitter, a transmission signal to a first bus wire of a bus;

transmitting the transmission signal to a second bus wire of the bus;

receiving, via a receiver, the bus signal that is transmitted on the first and second bus wires; and carrying out a diagnosis, using a diagnostic unit of the transceiver, only in a predetermined communication phase of the bus signal to detect a short circuit in the bus system;

wherein the method is performed using the transceiver for the bus system, in which collision-free access to the bus of the bus system by a user station is ensured, the transceiver including the transmitter, the receiver, and the diagnostic unit, wherein each of the user stations includes a communication control device for controlling a communication of the user station with another one of the user stations connected to bus, and wherein the transceiver is connected via first and second bus wires at first and second terminals to the bus via a common mode choke having an inductance, wherein at a transceiver, a voltage supply is provided via a third terminal, wherein a connection of the transceiver to a ground is established via a fourth terminal, and wherein a terminating device is provided for terminating the first and second bus wires, and wherein in the transceiver, the first and second bus wires are connected to the transmitter and the receiver, wherein a connector unit, which is for driving the signals via terminals to the communication control device, is connected to the transmitter and to the receiver.

* * * * *